March 11, 1924.

W. H. KRAMER

SAW SHARPENER

Filed June 3, 1922

Inventor
William H. Kramer,
By Arthur M. Hood.
Attorney

March 11, 1924.
W. H. KRAMER
SAW SHARPENER
Filed June 3, 1922
1,486,440
2 Sheets-Sheet 2
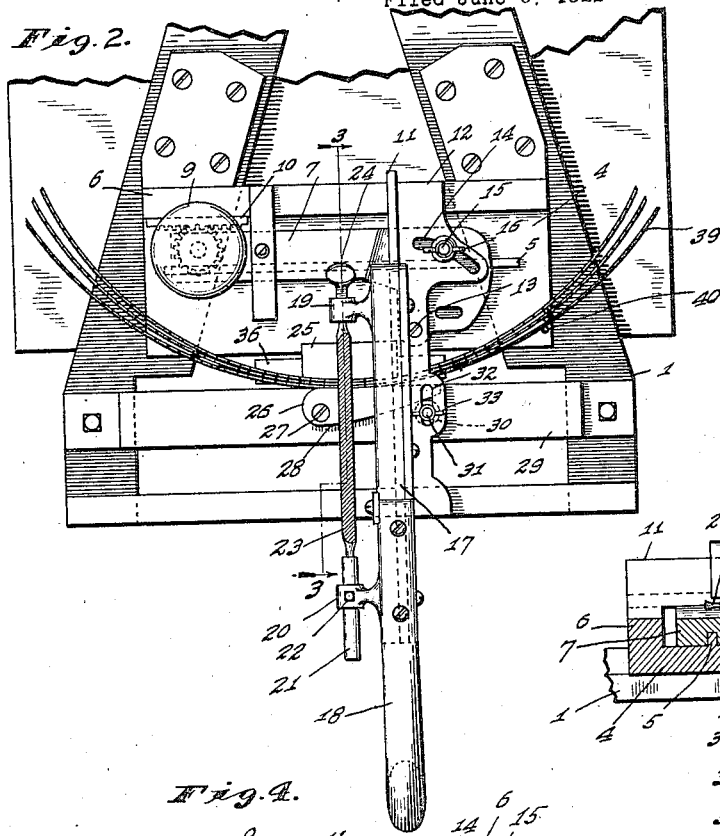
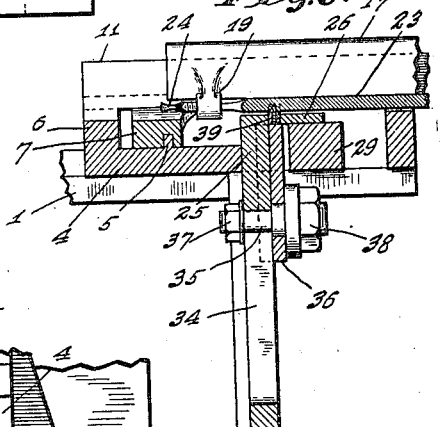
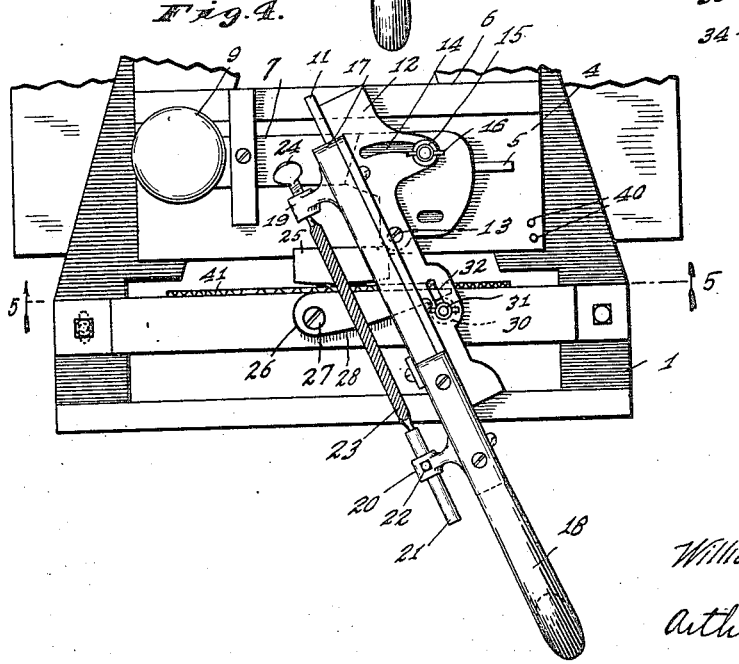
Inventor
William H. Kramer,
Arthur M. Hood
Attorney Patented Mar. 11, 1924.

1,486,440

UNITED STATES PATENT OFFICE.

WILLIAM H. KRAMER, OF EDINBURG, INDIANA; EMMA KRAMER ADMINISTRATRIX OF SAID WILLIAM H. KRAMER, DECEASED.

SAW SHARPENER.

Application filed June 3, 1922. Serial No. 565,512.

*To all whom it may concern:*

Be it known that I, WILLIAM H. KRAMER, a citizen of the United States, residing at Edinburg, in the county of Johnson and State of Indiana, have invented a new and useful Saw Sharpener, of which the following is a specification.

My invention relates to improvements in saw sharpening devices and, while being operable for sharpening various types of saws, is particularly applicable for sharpening band saws.

One of the objects of my invention is to provide a saw sharpening device for band saws which is arranged so that a plurality of teeth on a band saw may be sharpened at the same time by a single sharpening instrument. Other objects and advantages of my invention will appear more fully in the accompanying specification and claims.

In the embodiment illustrated:

Fig. 2 is a plan view of the structure illustrated in Fig. 1;

Fig. 3 is a sectional view taken on the line 3—3 of Fig. 2;

Fig. 4 is a plan view of the structure when employed for sharpening disk saws.

Figure 1:
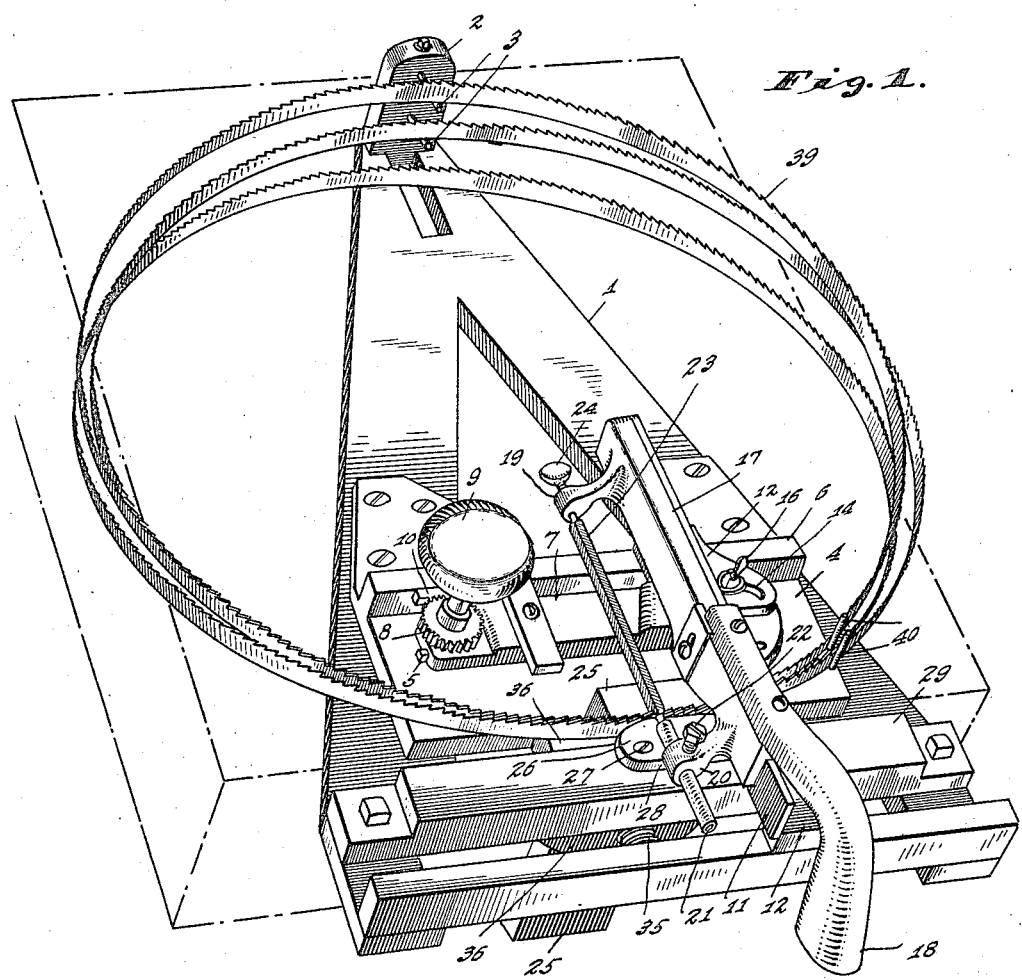
Fig. 1 is a perspective view of a saw sharpener embodying my invention as used for sharpening band saws.
Figure 5:
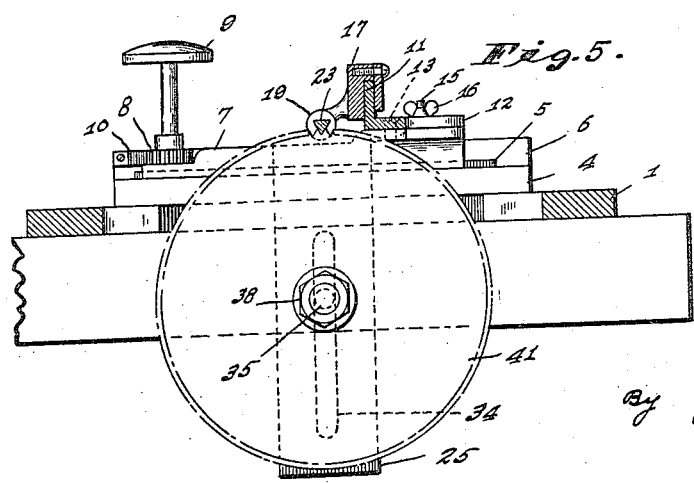
Fig. 5 is a sectional view taken on the line 5—5 of Fig. 4.

In the embodiment illustrated I provide a base 1 which is preferably triangular although this is not essential and at its rear end is provided with an upright support 2 having a plurality of forwardly extending pins 3 on which the free portion of the band saw is adapted to rest. This base 1 at its forward end supports a platform 4 having a transversely extending guide rail 5 and a slide rail 6. Slidably mounted upon the platform 4 and guided by the guide rail 5 is a carriage 7 which is reciprocated by means of a pinion 8 rotatably mounted on the carriage and having an operating handle 9. This pinion engages a rack 10 mounted on the slide rail 6.

Mounted upon the transversely reciprocated carriage 7 is the tool holder for sharpening the saw. This holder comprises a relatively stationary slide rail 11 mounted on a base 12 which is pivotally secured at 13 to the carriage 7. At the forward end of the base there is provided an arcuate slot 14 in which operates a pin 15 mounted on the carriage 7. A wing nut 16 threaded on the pin clamps the rail 11 in any position to which it may be moved. Reciprocably mounted on the rail 11 is the movable member of the tool holder which member comprises a tool receiver 17 slotted on its under face to fit and slide on the rail 11 and provided with a pistol grip handle 18. Extending laterally from one side of the receiver 17 is a pair of lugs 19 and 20. The lug 20 carries an adjustable rod 21 held in its adjusted position by a set screw 22, the forward end of the rod being adapted to receive one end of the saw file 23. The opposite end of the file is socketed in the lug 19 and held in clamped position between the end of the rod 21 and a set screw 24. The saw to be filed is held in filing position in a vise beneath the file 23. One jaw 25 of this vise is stationary and is preferably mounted on the support 4. The opposite jaw 26 is pivoted at 27 and is provided with a cam surface 28. This jaw is mounted upon a cross arm 29 and the cam surface of this jaw is arranged to be engaged by a roller 30 mounted upon a pin 31 extending through a slot 32 in the base 12. A clamping wing nut 33 holds the pin in any adjusted position. The stationary vise jaw 25 is preferably elongated and extends downwardly being slotted as at 34 to receive a pin 35 on an adjustable anvil 36. This anvil is grooved to fit over the downwardly extending portion of the jaw 25 and is guided thereby. Suitable nuts 37 and 38 are mounted on the pin 35 for clamping the anvil in its adjusted position.

The carriage 7 and the parts supported thereby are removably mounted on the base 4 and in sharpening a band saw this carriage is first removed to permit the saw to be placed in position. The saw 39 is folded upon itself to form three loops and is placed in position upon the base with the teeth all extending upwardly. In looping the saw for the purpose of placing it in the position the saw is elongated with more or less elliptical shape. The two elongated sides are drawn together and caused to overlap at two points forming at each end two substantially circular loops and in the center a third substantially circular loop. The two end circular loops are then doubled under so that the saw assumes a final position comprising three substantially circular loops as shown in Fig. 1 of the drawing. To loop this saw as above the operator grips the saw at opposite points, a distance from one bight, turns the upper edges of the saw inward, raising the hands with the far bight resting upon the floor, then swings the hands together passing one side of the saw beneath the other continuing the twisting action upon the blade, then swings the bight which initially rested against the body forwardly beneath the crossed portions of the blade.

The free portion of the looped saw rests upon the pins 3 and the other portion is arranged between the vise jaws 25 and 26, the folds being guided and positioned by means of the guide pins 40. After the saw is placed in position the carriage and associated parts are placed in position on the base above the saw with the file engaging the teeth of the saw. Care should be taken to arrange the aligned teeth of the three loops set in the same direction. With the parts in the above described assembled position the handle 9 is manipulated to move the file 23 to the right, looking at Fig. 1. Due to the fact that the sliding member 17 has merely a groove and slot connection with the rail 11 the sliding member may be slightly raised to permit the file 23 to clear the teeth on its backward movement. After the file has been moved sufficiently far back it is lowered into engagement with one set of the teeth and the handle 9 manipulated to advance or move the carriage to the left, viewing the structure as shown in Fig. 1. The file 23 is thus moved into engagement with the teeth and at the same time the three loops of the saw are advanced one step, the roller 30 engaging the cam face 28 of the vise member 26 and forcing the vise member into engagement with the saw blade to securely clamp the three folds of the blade in position. The file may then be moved back and forth to sharpen the three teeth which are in alignment, after which the handle 9 may be operated to move the file back, the operator lifting the file at the same time and the file then lowered into engagement with the next set of three teeth and by manipulating the handle 9 these are advanced by the file and gripped in the vise for a filing of these teeth. This operation is continued until all of the teeth of the saw are sharpened.

In Fig. 4 I have illustrated the structure used for sharpening the teeth of a rotary or disk saw. When using the structure in this relation the anvil 36 is lowered and the disk saw 41 secured on the front end of the pin 35, being held in locked position by the nut 38. The anvil member 36 is lowered sufficiently to bring the upper teeth of the saw in proper alignment with the file 23 and the anvil is then locked in its adjusted position by the nut 37. The manipulation of the carriage 7 and file 23 is the same as above described with the exception that as the file is moved forward one step it rotates the saw on the pivot pin 35. In a disk saw the alternate teeth are cut at different angles. Therefore in operating on the disk saw the base 12 is swung on its pivot 13 to the angle desired, being guided by the slot 14 and pin 15. The set screw 16 holds the base in its angular position and in reciprocating the carriage 7 it is moved so as to advance the saw blade two teeth at a time so that each alternate tooth will be cut with the file at the angle illustrated in Fig. 4. After this set of teeth have been cut the base 12 may be swung in the opposite direction until the angle has been changed to cut the remaining teeth at the proper angle and the carriage and file manipulated to sharpen the remaining teeth.

I claim as my invention:

1. In a saw sharpener, the combination with means for holding at one point a plurality of sections of an endless band saw, one behind the other, with the teeth of said sections in alignment, of a cutting tool arranged to engage and sharpen said aligned teeth.

2. In a saw sharpener, the combination with means for supporting a band saw formed into a plurality of loops and gripping said loops to hold sections of the loops in position, one behind the other, with the teeth in alignment, of a cutting tool arranged to engage and sharpen all of said aligned teeth during one cutting operation.

3. In a saw sharpener, the combination with means for holding a band saw arranged in loop formation, with the portions of the loops supported to permit the loops to move without interference with one another, means for gripping said loops at one point to hold them one behind the other with their teeth in alignment, and a cutting tool arranged to engage the aligned teeth and sharpen the same.

4. In a saw sharpener, the combination with means for holding an endless band saw arranged in a plurality of substantially circular loops, means for gripping said loops at one point to hold the same rigidly and one behind the other with the teeth in alignment, and a cutting tool arranged to engage the aligned teeth and sharpen the same, said loops being rotatable in use to permit the presentation of new sets of aligned teeth to sharpening positions.

5. In a saw sharpener, the combination with a base, of a carriage reciprocably supported on said base, a cutting tool holder carried by said base and reciprocably mounted to move in a direction transverse to the movement of said base, a vise, and means operated by the movement of the cutting tool into engagement with the teeth of the saw for operating said vise to grip the saw.

6. In a saw sharpener, the combination with a base, of a carriage reciprocably mounted on said base, a cutting tool holder mounted on said base to reciprocate in a direction substantially transverse to the movement of the carriage, means for removably securing a cutting tool on said carriage, a vise, and means operated by the movement of said carriage for operating said vise to grip the saw in sharpening position.

7. In a saw sharpener, the combination with a base, of a carriage reciprocably mounted on said base, a sharpening tool holder carried by said base and comprising a relatively stationary member adjustably mounted on said base, and a tool holding member reciprocably mounted on said relatively stationary member and operating in a direction substantially transverse to the movement of the carriage, a vise, and means operated by the movement of said carriage for operating said vise to cause it to grip the saw and hold the same in sharpening position.

8. In a saw sharpener, the combination with a base, of a reciprocating sharpening tool holder, a vise and means for simultaneously moving said tool supported by said holder substantially at right angles to the line of cut and into engagement with the saw teeth and operating said vise for gripping the saw.

9. In a saw sharpener, the combination with a base, of a vise mounted thereon for holding a saw, a carriage reciprocably mounted on said base, a tool holder guide mounted on said carriage and movable therewith, a tool holder reciprocably mounted on said guide and having a vertical movement thereon, and means operated by said carriage for moving the tool of said holder substantially at right angles to the line of cut and into engagement with the saw in said vise and simultaneously operating said vise to cause it to grip the saw.

10. The method of sharpening a band saw which consists in first looping the saw to form three substantially circular loops with the teeth of the saw all arranged on the same side, holding a portion of said loops in substantially rigid position adjacent one another and with the teeth in alignment and simultaneously removing a portion of the metal of the aligned teeth.

11. The method of sharpening a band saw which consists in first looping the saw to form three substantially circular loops with the teeth of the saw all arranged on the same side, holding a portion of said loops in substantially rigid position adjacent one another and with the teeth in alignment and removing a portion of the metal of the aligned teeth simultaneously, then advancing the loops a step to present a new set of teeth removing a portion of the metal from said teeth and continuing alternate steps of sharpening a row of teeth and advancing the loops to present a new set of teeth.

12. In a saw sharpener the combination with a base, of a reciprocating sharpening tool holder, a vise in which the saw is arranged to be held, the teeth of the saw being arranged to be engaged by the tool in said holder to advance the saw step by step into operative position, and means operating with the movement of said tool holder in advancing the saw for clamping the vise upon said saw.

13. In a saw sharpener the combination with a base, of a sharpening tool holder reciprocable to permit the tool held thereby to be operated for cutting purposes, said tool holder having a reciprocal movement substantially transverse to said first reciprocal movement to permit the tool held thereby to engage the teeth of the saw to advance the same step by step into cutting position, a vise and means operating with said second mentioned movement of the tool holder for operating said vise to alternately engage and release the saw.

14. In a saw sharpener the combination with a reciprocable carriage, of a tool holder mounted on said carriage and reciprocable transversely thereof, a tool mounted in said holder, a vise for supporting the saw in position to be operated on by the tool, the tool being arranged to engage the teeth of the saw and advance the same step by step by the advance and reciprocal movement of the carriage and means whereby the advance and reciprocal movement of the carriage will alternately operate the vise to grip the saw and release the same.

15. In a saw sharpener the combination with a reciprocable carriage, of a sharpening tool holder mounted on said carriage and reciprocable substantially transversely to the line of movement thereof, a vise in which the saw is adapted to be held to be operated upon by said sharpening tool and means operated by the first mentioned reciprocal movement of said carriage for causing said vise to be operated alternately to grip and release the saw.

In witness whereof, I have hereunto set my hand at Indianapolis, Indiana, this 3rd day of May, A. D. one thousand nine hundred and twenty two.

WILLIAM H. KRAMER.